United States Patent
Lohchab et al.

(10) Patent No.: US 11,093,380 B1
(45) Date of Patent: Aug. 17, 2021

(54) AUTOMATED TESTING OF BACKUP COMPONENT UPGRADES WITHIN A DATA PROTECTION ENVIRONMENT

(71) Applicant: EMC IP Holding Company LLC, Hopkinton, MA (US)

(72) Inventors: Sanjeev Lohchab, Bangalore (IN); Sowmya Devarahalli Nanjappa, Karnataka (IN); LahariCharan Bejjanke, Warangal (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/888,223

(22) Filed: May 29, 2020

(51) Int. Cl.
*G06F 11/36* (2006.01)
*G06F 8/65* (2018.01)
*G06F 9/445* (2018.01)

(52) U.S. Cl.
CPC ............ *G06F 11/3692* (2013.01); *G06F 8/65* (2013.01); *G06F 9/445* (2013.01); *G06F 11/3664* (2013.01); *G06F 11/3688* (2013.01)

(58) Field of Classification Search
USPC ....................................................... 717/126
See application file for complete search history.

(56) References Cited

U.S. PATENT DOCUMENTS

| | | | | |
|---|---|---|---|---|
| 6,907,602 | B2* | 6/2005 | Tsai | G06F 8/65 717/168 |
| 8,978,015 | B2* | 3/2015 | Pechanec | G06F 11/3672 717/126 |
| 9,804,957 | B1* | 10/2017 | Chopra | G06F 11/3688 |
| 2013/0054533 | A1* | 2/2013 | Hao | G06F 16/128 707/649 |
| 2013/0227543 | A1* | 8/2013 | Chen | G06F 8/65 717/173 |
| 2017/0093972 | A1* | 3/2017 | Paulzagade | H04L 67/42 |
| 2017/0262345 | A1* | 9/2017 | Wang | G06F 11/2094 |
| 2018/0173874 | A1* | 6/2018 | Muttik | G06F 21/64 |

OTHER PUBLICATIONS

Tess Hanna; "A Step by Step Guide to Backup Testing"; Solutions Review (.com) website [full url in ref.]; Sep. 10, 2019 (Year: 2019).*

* cited by examiner

*Primary Examiner* — Qing Chen
*Assistant Examiner* — Clint Thatcher
(74) *Attorney, Agent, or Firm* — Dergosits & Noah LLP; Todd A. Noah

(57) ABSTRACT

Described is a system for automating the testing of backup component upgrades within a data protection environment. More specifically, the system may automate the testing of various upgrade combinations of a backup application to verify the compatibility of the new version with various prior versions of the backup application. In addition, the system may also verify the operational consistency amongst variable client computing environments. To ensure interoperability between backup application versions, the system may simulate various potential interactions between versions that would potentially be implemented within various storage configurations by a client production environment. For example, the automation manager may automate certain backup related operations with previous versions of the backup application such as creating backup instances of data, and then verifying the newer version of the backup application may correctly restore such backup instances and perform other backup-related operations.

20 Claims, 6 Drawing Sheets

AUTOMATED TESTING OF BACKUP COMPONENT UPGRADES WITHIN A DATA PROTECTION ENVIRONMENT

TECHNICAL FIELD

This disclosure relates to testing application upgrades, and more particularly, automating the testing of backup application upgrades within different storage environments.

BACKGROUND

Data storage systems (or on-demand storage services) may provide various tools that are crucial for enterprise level network clients. For example, clients may rely on data protection and recovery services to efficiently back up and recover data in the event of user error, data loss, system outages, hardware failure, or other catastrophic events to allow business applications to remain in service or quickly come back up to service. As part of such services, providers may support a wide range of products for managing indispensable data. To support such products, providers may periodically release new versions (or builds) of critical components such as backup-related applications. Accordingly, as part of the development process, providers must perform rigorous testing to ensure vital processes and data are maintained when upgrading to new application versions in existing client production environments. However, different clients may implement a wide range of computing environments that span multiple types of physical and cloud-based infrastructure. In addition, clients may not always perform updates in an incremental manner, and accordingly, the upgrades may be performed within computing environments that implement different existing application versions. As a result, testing applications that account for such variable client environments becomes increasingly challenging. Thus, there is continued need for tools that efficiently manage testing processes for backup-related applications.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
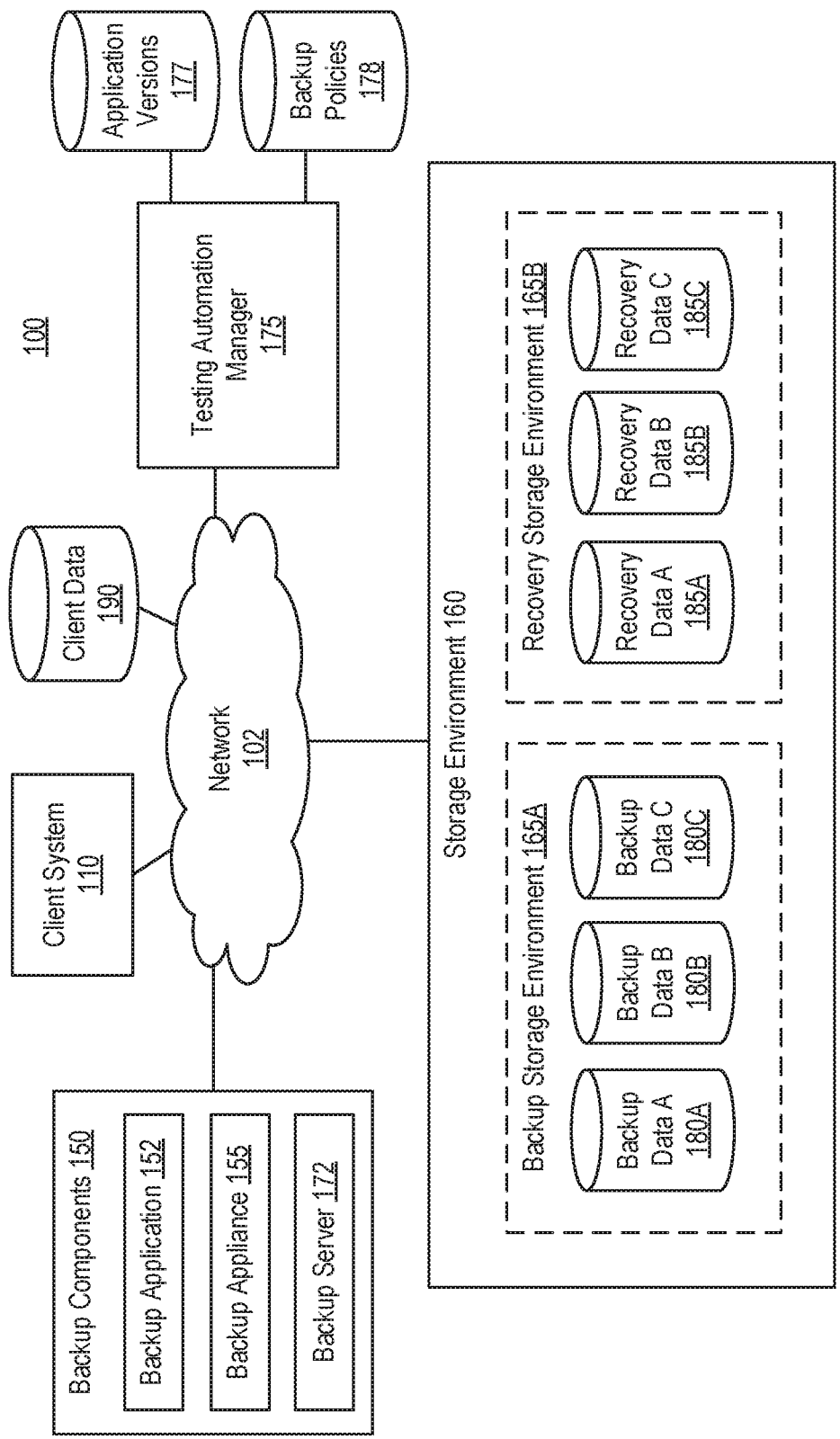
FIG. 1 is a block diagram illustrating an example operating environment for automated testing according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method) for automating the testing of backup component upgrades within a data protection environment. For example, the system may provide an efficient mechanism for testing the deployment of a new version (or build) of a backup application implemented by clients of a data protection and recovery service (or platform). In some embodiments, the system automates the testing of various upgrade combinations of a backup application to verify the compatibility of the new version with various prior versions of the backup application. In addition, the system may also verify the operational consistency of the backup application within variable client computing environments.

To provide such a capability, in some embodiments, the system may utilize specialized components within a testing environment such as an automation manager. For example, the automation manager may determine a set of available versions of a backup application, and identify a set of combinations of upgrading a previous version of the backup application to an updated version. To ensure interoperability between such versions of a backup application, the automation manager may simulate various interactions between versions that would potentially occur within client production environments. For example, the automation manager may automate certain backup related operations with previous versions of the backup application such as executing backup policies and creating backup instances of data (e.g. backup and recovery instances). The system may then verify the newer version of the backup application may correctly restore such backup instances and perform other backup-related operations. Accordingly, the system may verify the restored data is usable, consistent with point-in-time intervals, and complies with various other requirement such as recovery point objectives (RPOs) and recovery time objectives (RTOs). Moreover, such a process may be automated for any number of upgrade combinations or computing environments.

Accordingly, in some embodiments, the system provides the ability to test a multitude of variables that may be associated with deploying a backup application within client production environments as part of providing a data protection and recovery service.

In some embodiments, such a system may be provided within an operating environment. An example of such an operating environment is further described herein with reference to FIG. 1. However, in general, embodiments of the disclosure may include and/or be implemented in an operating environment including a cloud-based services environment that may be, or include, a data protection operating environment that includes data protection and recovery services. For example, at least some functionality may be provided by, or implemented in connection with, various platforms such as the Data Domain™ data protection platform provided by Dell EMC™ Corporation (Dell EMC), and associated systems, methods, and components, although use of this particular platform is provided only by way of illustration and is not required.

In some embodiments, the operating environment may take the form of a cloud-based environment. However, embodiments of the disclosure may also be implemented for an on-premises environment, and hybrid environments that include public and private elements, as well as any other type of environment. In addition, any of these cloud environments, or other operating environments, may take the form of an operating environment that is partly, or completely, virtualized. The environment may include one or more host devices that each host one or more applications used by a client of the environment. As such, a particular client may employ, or otherwise be associated with, one or more instances of each of one or more applications. In general, the applications employed by the clients are not limited to any particular functionality or type of functionality.

Any of the devices, including the clients, servers, and hosts, in the operating environment can take the form of software, physical machines, or virtual machines (VM), or any combination thereof, though no particular device implementation or configuration is required for any embodiment. Similarly, storage components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the storage of data can employ any suitable storage technique (e.g. file-based, block-based, object-based storage, etc.), infrastructure (e.g. cloud-based), or hardware (e.g. Solid State Drive (SSD), Hard Disk Drive (HDD), etc.).

More specifically, and with reference to FIG. 1, shown is a block diagram illustrating an example of an operating environment 100 for automated testing for backup applications according to one or more embodiments of the disclosure.

As shown, the environment 100 may include a client system 110, client data 190, backup components 150, a testing automation manager (or automation manager) 175, stored application versions 177 and backup policies 178, and a storage environment 160. The components of operating environment 100 may interact via a network 102, which may be any type of wired or wireless network including a local area network (LAN), a wide area network (WAN), or a direct communication link, or other suitable connection.

In some embodiments, operating environment 100 may represent a testing environment that may recreate or simulate (e.g. via VMs) a production operating environment 100. For example, the operating environment 100 may simulate a storage environment 160 that includes various storage configurations that may be associated with a client of a data protection and recovery service. For example, the storage environment 160 may recreate or simulate various combinations of physical hardware (e.g. servers, storage array, databases, etc.) that a client (or service provider) may implement within an on-premises or cloud-based environment.

The client system 110 may be associated with a client (or customer) of a data protection (or backup) and recovery service. For example, the client system 110 may create new and/or modified client data 190 that is desired to be protected. The client data 190 may include one or more data protection assets. For example, a data protection asset (or data asset) may include a file system, operating system environment, application, database, or any other types of data. In some embodiments, a data protection asset may be part of one or more storage resources. For example, a data protection asset may be stored as part of a set of LUNs (logical unit numbers) that may be organized (or associated with) one or more consistency groups. In some embodiments, the client data 190 may be part of the storage environment 160 (e.g. stored as part of a cloud-based storage array).

The backup components 150 may include a backup application 152 that performs (or manages, coordinates, etc.) the creation and recovery (or restoration) of data as part of a data protection and recovery service. For example, the backup application 152 may include a component (or sub-component) that performs one or more functions such as managing client configurations, policy settings, schedules, monitoring, reports, and various other backup-related operations. In some embodiments, the backup application 152 may be a product that can perform backup operations include across physical and virtual environments. For example, the backup application 152 may include a NetWorker application (or platform) provided by Dell EMC. In some embodiments, client data 190 may be communicated from the client system 110 to the backup application 152 for storage within the storage environment 160. In some embodiments, the backup application 152 may cooperate with a backup client application of the client system 110 to back up client data 190. In some embodiments, the backup application 152 may be a part of, or work in conjunction with, a backup appliance 155. For example, the backup (or storage) appliance 155 may include a Dell EMC CloudBoost appliance, although any suitable appliance is contemplated. In addition, the backup components 150 may include a backup server 172 that may be implemented in conjunction with a Data Domain deduplication storage server provided by Dell EMC for use with Data Domain Restorer (DDR) storage devices. In some embodiments, the backup server 172 may be a Dell EMC Avamar server or a Dell EMC NetWorker server, although no particular server is required, and other backup and storage system configuration are contemplated. It should be noted that the backup components 150 (e.g. backup application 152, backup appliance 155, or backup server 172) can be implemented in various forms, such as a virtual, physical, or native public cloud appliance to fit the requirements of a particular configuration, and the backup application 152 can be used with various types of data protection environments, including public and private object storage clouds.

The storage environment 160 may include a backup storage environment 165A, and a recovery storage environment 165B. For example, a data protection and recovery service may include backing up client data 190 to a backup storage environment 165A, and replicating data stored within the backup storage environment 165A to the recovery storage environment 165B. In some embodiments, the recovery storage environment 165B may represent a disaster recovery environment that is remote from the backup storage environment 165A.

As shown, the backup storage environment 165A may store backup data 180 that represents one or more copies (or backups) of a data protection asset (e.g. client data 190). For example, one or more backup instances of a data protection asset may be stored as backup data A 180A, backup data B 180B, and backup data C 180C. Correspondingly, as shown, the recovery storage environment 165B may store recovery data 185 that represents a recovery copy (or clone, replica, etc.) of the data protection asset. For example, recovery instances of backup data 180A, 180B, and 180C may be stored as recovery data A 185A, recovery data B 185B, and recovery data C 1805C respectively. To create the backup data 180 and the recovery data 185, the operating environment 100 may implement different copying (or replication) techniques. In some embodiments, backup data 180 may include point-in-time copies that are stored as snapshots (or "thin-clones"). In some embodiments, a snapshot may not replicate a full copy of a data protection asset, and instead, may only store differences between a current version of the data and the version of the data at the point in time when the snapshot was taken. For example, a snapshot may be created using a redirect on write (ROW) technique that redirects new writes of a snapshot to a new location in the same storage pool (e.g. a collection of physical storage components), and updates pointers to reference the new location. It should be noted that there are many different specific mechanisms for providing snapshot copies, see, for example, U.S. Pat. No. 7,340,489 to Vishlitzky, et al., entitled "Virtual Storage Devices," and U.S. Pat. No. 6,792,518 to Armangau et al., entitled "Data Storage System Having Mata [Meta] Bit Maps for Indicating Whether Data Blocks are Invalid in Snapshot Copies," both of which are incorporated by reference herein in their entirety, and both of which are assigned to EMC IP Holding Company LLC.

In some embodiments, recovery data 185 may include a clone (or copy) of a data protection asset. For example, a clone (or full clone) may include a complete copy of a data protection asset (e.g. an entire database copy). For instance, recovery data 185 may include a full copy of a data protection asset that may be used to recreate client data 190 in the event that client data 190 and backup storage environment 165A are unavailable. As described, in some embodiments, a data protection asset may be stored within a set of LUNs from which a snapshot and/or clone may be created.

The automation manager (or manager) 175 may coordinate (or manage, orchestrate, execute, automate, etc.) various automated testing operations (or processes, methods, etc.). In some embodiments, the automation manager 175 may automate the process of testing an upgrade to a backup-related component. For example, the backup-related component may include a backup application (e.g. backup application 152). It should be noted that the term "backup application" should be construed broadly and may include any type of component (or sub-component) that may be associated with performing various operations as part of data protection and recovery service.

In some embodiments, the automation manager 175 may simulate upgrades to various application versions 177 of a backup application, and perform testing to verify that each version of the backup application works correctly (e.g. without error, data loss or corruption, incident, etc.). For example, the testing may include automating various operations such as initiating a particular version of a backup application to create backup polices 178, execute backups, restore backups, and perform any other backup-related operations. The application versions 177 may include various versions, builds, generations, releases, etc. of a backup application (or related component) that a client may implement as part of a data protection and recovery service (or system). Accordingly, the automation manager 175 may verify that operations performed by a particular version of the backup application are compatible with aspects of prior versions of the backup application. In addition, in some embodiments, the automation manager 175 may provide a user interface that allows a user to perform and configure various backup-related testing operations. For example, the user interface may allow a user to input a testing configuration file. For example, the configuration file may include a list of backup application versions to test, backup polices, computing environments to simulate, etc.

In some embodiments, the automation manager 175 may be part of (or work in conjunction with) one or more of the backup components 150. In addition, the automation manager 175 may be part of, or work in conjunction with, an operating system of a storage system. Accordingly, the automation manager 175 may direct (or control, initiate, etc.) other components of the operating environment 100 to perform various operations as further described herein. Accordingly, components of operating environment 100 may perform an automated testing procedure as further described herein.

Figure 2A:
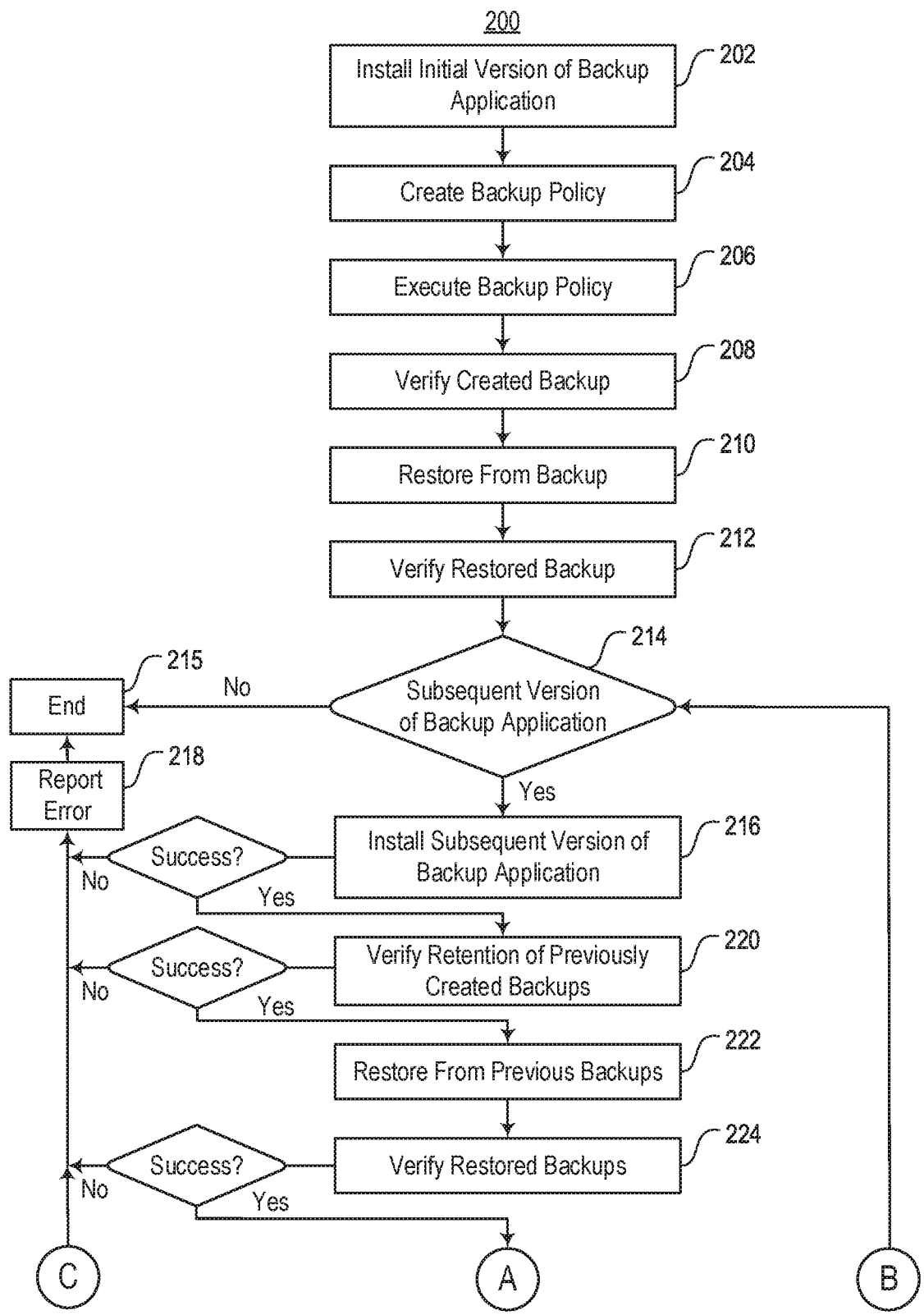
FIG. 2A is a flow diagram illustrating an example process flow for testing backup application upgrades according to one or more embodiments of the disclosure.
Figure 2B:
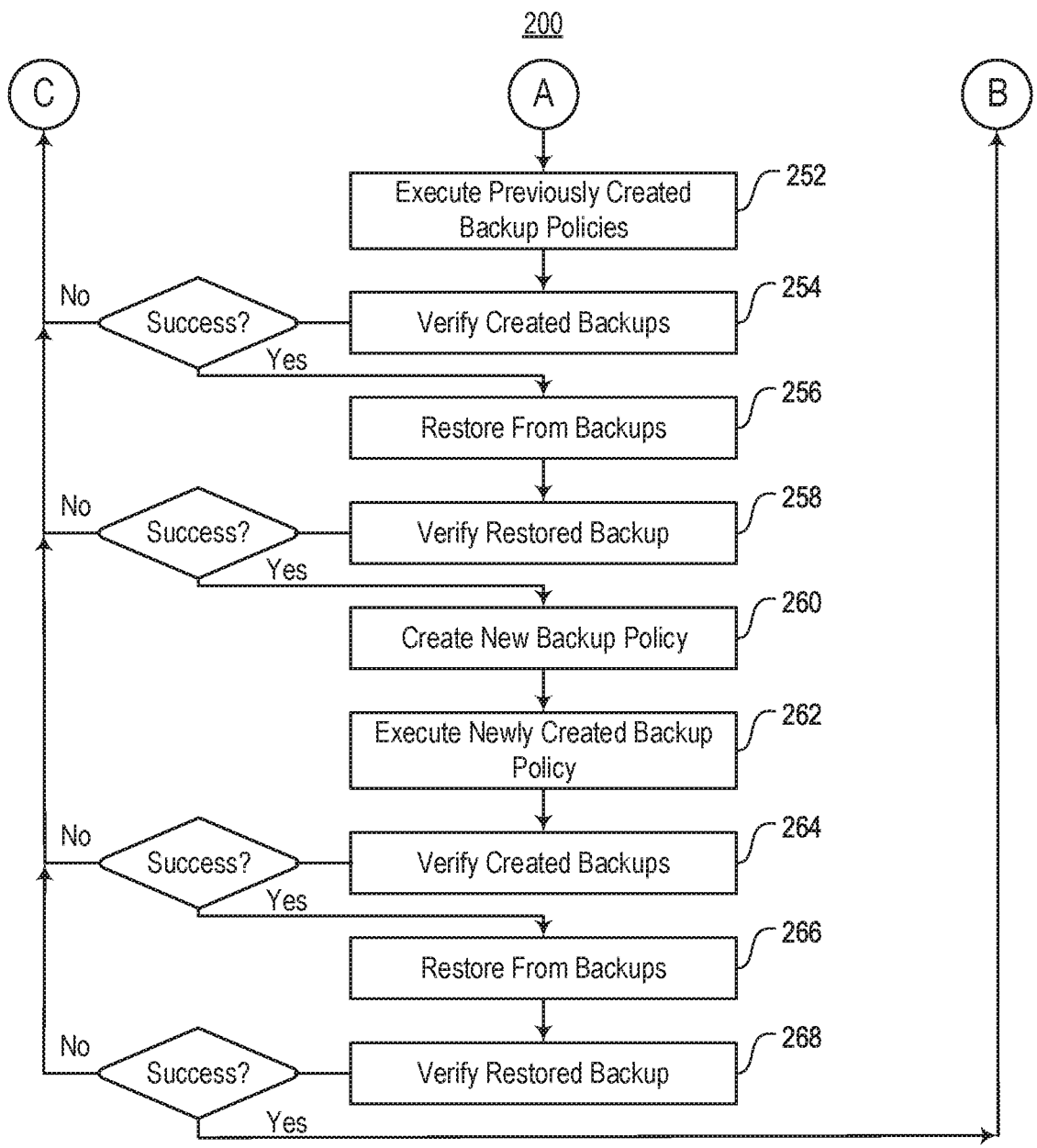
FIG. 2B is a flow diagram continuing the example process flow diagram of FIG. 2A for testing backup application upgrades according to one or more embodiments of the disclosure.

FIGS. 2A and 2B show an example process flow diagram 200 illustrating a process for automated testing of backup application upgrades according to one or more embodiments of the disclosure. Process 200 may use processing logic, which may include software, hardware, or a combination thereof. For example, process 200 may be performed by a system including one or more components (e.g. automation manager 175) described in operating environment 100.

In general, the system (e.g. the automation manager 175) may simulate various upgrade scenarios and verify that each upgrade of the backup application correctly interacts with components of previous versions. In other words, in some embodiments, the system may simulate (or replicate, mimic, etc.) various combinations of upgrades that a client (or customer) may undergo, and ensure that each version of the backup application may perform backup-related operations within varying client production environments.

As shown in FIG. 2A, in 202, the system may install an initial version of the backup application with an environment. In some embodiments, the system may create one or more virtualized environments that simulate the various client environments that utilize, for example, different types of services or hardware (e.g. servers, storage arrays, etc.). When determining which backup application versions to test, the system may receive input (e.g. via a testing configuration file) indicating a list of potential existing application versions utilized by clients, and accordingly, the system may determine a set of potential upgrade combinations. For example, not all clients may perform each incremental upgrade of a backup application, and thus, the testing may account for clients performing an upgrade from different prior versions.

In 204, the system may create a backup policy. In some embodiments, the system may initiate the initial backup application version to create the backup policy. The backup policy may include various types of information used to specific backup characteristics (or features, attributes, etc.). In some embodiments, the backup policy may indicate what types of client data are to be backed-up. For example, the type of data to backup may include one or more storage assets such as certain VMs, applications, databases, etc. The backup policy may also include scheduling information for backups. For example, the scheduling information may specify when point-in-time copies of the data protection assets are to be taken (e.g. hourly daily, weekly, etc.). For instance, the backup policy may specify that backups (e.g. snapshots, and clones) of one or more data protection assets are to be stored on an hourly basis. The backup policy may also indicate the type, storage location (or target), and number of backups to be created. For example, the system may indicate that primary point-in-time copies of a data protection asset are to be stored as snapshots on a first type of storage (e.g. SSD), and one or more corresponding complete recovery copies (e.g. clones) of the data protection asset are to be stored on a second type of storage (e.g. cloud-based recovery storage), and a third type of storage (e.g. cloud-based long term retention storage).

Once a backup policy is created, the system may initiate the initial backup application version to execute the backup policy in 206. After the backup policy is executed, the system may verify the created backup in 208. For example, the system may confirm that data specified to be backed-up in the backup policy is in fact backed-up. In addition, the system may verify various attributes associated with the backup match the attributes specified in the backup policy. For example, if the backup policy indicates that a set of snapshots and corresponding clones are to be created at certain point-in-time intervals, the system may verify the existence of such snapshots and clones for each interval. As another example, the system may verify the number of snapshots or clones created, and the storage location of such created snapshots or clones match those of the backup policy.

Next, in 210, the system may restore a data protection asset from the created backup. For example, the system may "rehydrate" the data to reverse any data processing (e.g. encryption, compression, deduplication, etc.) performed when creating a backup. The system may then verify the restored backup in 212. In some embodiments, verifying the restored data may include verifying (confirming, validating, etc.) the data protection asset is returned to a usable (or original) state. For example, if the data protection asset includes a VM, the system may verify the VM is returned to a fully operational state. As another example, if the data protection asset includes a database, the system may verify the database includes all of the original data (and metadata). For instance, the verification may include performing an operation to compare the restored database to the original database. As yet another example, the system may verify a set of LUNs and consistency groups are returned to their original configuration and state. As part of the verification process, the system also verify certain RTOs are satisfied. For example, the system may verify that a data protection asset may be restored from various storage environments in a timely manner.

Once the system verifies the operations performed by the initial version of the backup application, the system may determine whether a subsequent version of a backup application requires testing in 214. If not, the process may end in 215. Otherwise, the system may proceed to verify that a subsequent version of the backup application is compatible with aspects of the initial version of the backup application tested. For example, the system may install (or active, invoke, etc.) a subsequent version of a backup application in 216. In some embodiments, the subsequent version may be based on a potential upgrade combination determined by the system. If the installation of the subsequent version fails, the system may create an error report in 218, and the process may end in 215. Otherwise, the system may proceed to verify the retention (or availability, usability, etc.) of previously created backups in 220. In some embodiments, the system may verify that the subsequent version of the backup application can access the previously created backups by earlier versions of the backup application already tested (e.g. by at least the initial backup application version). For example, in a production setting, a client may still require access to existing backups (or related information) upon upgrading the backup application. If the retention of previous backups is unsuccessful, the system may create an error report in 218, and the process may end in 215. Otherwise, as part of the testing, the system may proceed and initiate the subsequent version of the backup application to restore any previously created backups in 222. In 224, the system may then verify the restored backups, for example, in a similar manner as described above (e.g. in operation 212). If the restoration if unsuccessful, the system may create an error report in 218, and the process may end in 215. Otherwise, process 200 may continue as further described with reference to FIG. 2B (via connector element A).

As shown in FIG. 2B, process 200 may continue, and in 252, the system may initiate the subsequent version of the backup application to execute the previously created backup policies. For example, in a production setting, a client may still require the ability to execute existing backup policies (e.g. created by prior versions of the backup application) upon upgrading the backup application. In 254, the system may then verify the created backup, for example, in a similar manner as described above (e.g. in operation 208). If the verification is unsuccessful, the system may (e.g. via connector C) create an error report in 218, and the process may end in 215. Otherwise, in 256, the system may proceed and restore the backups created from existing backup polices. In 258, the system may then verify the restored backup, for example, in a similar manner as described above (e.g. in operation 212). If the restoration is unsuccessful, the system may create an error report in 218, and the process may end in 215. Otherwise, the system may proceed and create a new backup policy in 260. Once the new backup policy is created, the system may initiate the subsequent backup application version to execute the new backup policy in 262. After the backup policy is executed, in 264, the system may verify the created backup, for example, in a similar manner as described above (e.g. in operation 208). If the verification is unsuccessful, the system may (e.g. via connector C) create an error report in 218, and the process may end in 215. Otherwise, in 266, the system may proceed and restore the backups created from the new backup policy. In 268, the system may then verify the restored backup, for example, in a similar manner as described above (e.g. in operation 212). If the verification is unsuccessful, the system may (e.g. via connector C) create an error report in 218, and the process may end in 215. Otherwise, the system may proceed (e.g. via connector B) and return to operation 214, and determine whether to perform testing for a subsequent version of the backup application. Accordingly, the system may repeat operations 216-268 as many times as necessary to test any number of upgrade combinations for a backup application. In addition, the system may repeat operations 216-268 to simulate backup upgrades within different operating environments. For example, the system may perform operations 216-268 for a first client environment (e.g. including a first storage array configuration or type), and repeat the operations for a second client environment (e.g. including a second storage array configuration of type).

Figure 3A:
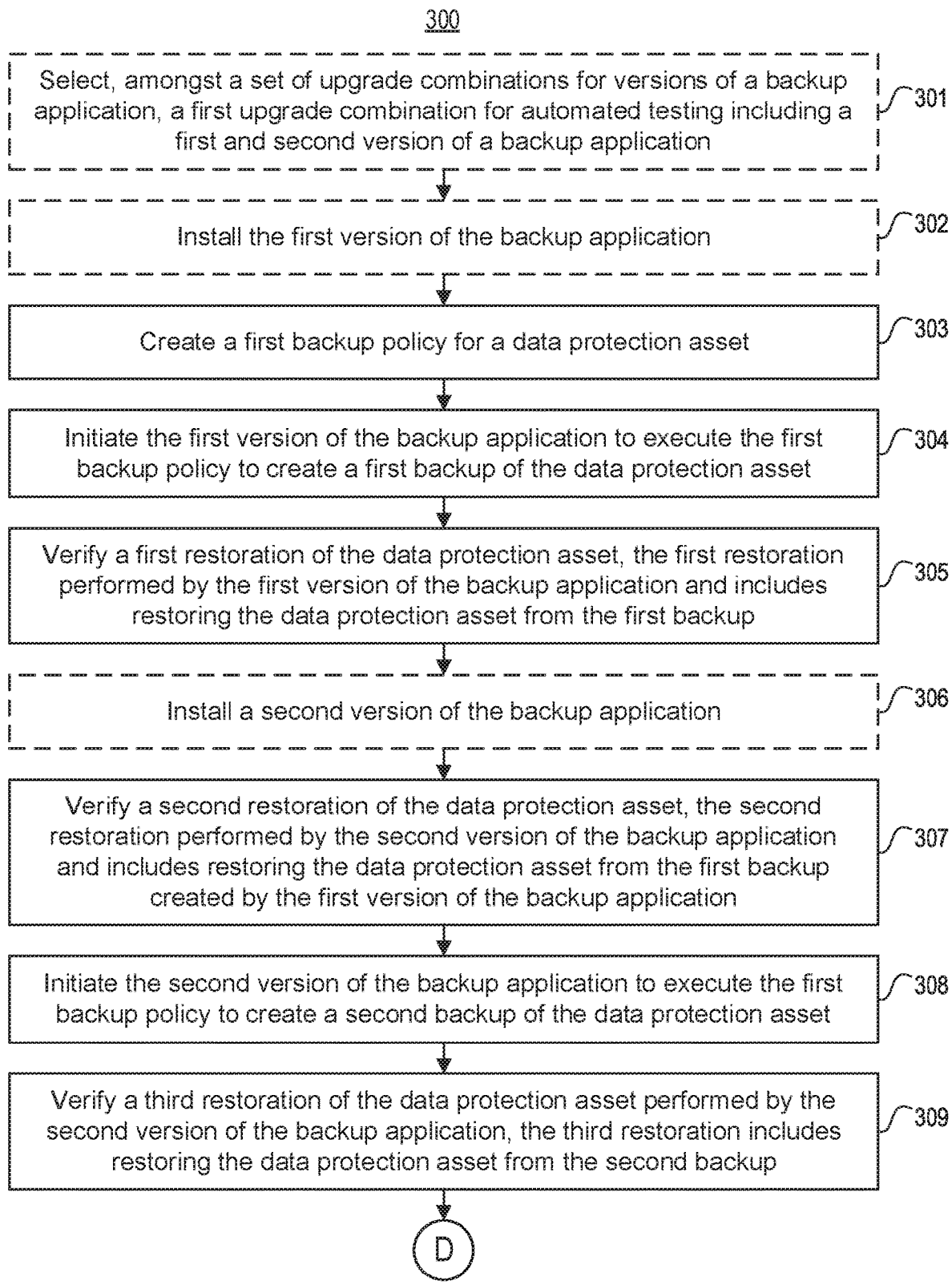
FIG. 3A is a process flow diagram illustrating an example method of automating the testing of various backup application upgrades according to one or more embodiments of the disclosure.
Figure 3B:
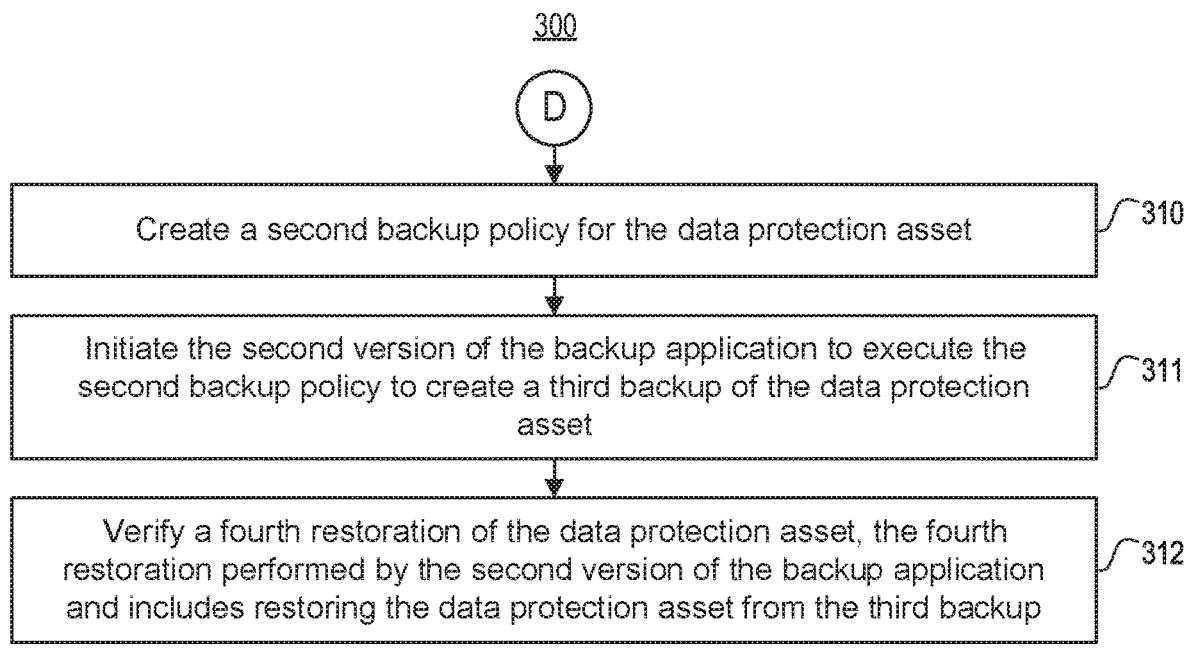
FIG. 3B is a process flow diagram continuing the example method of FIG. 3A of automating the testing of various backup application upgrades according to one or more embodiments of the disclosure.

FIGS. 3A and 3B show a process flow diagram 300 illustrating an example method of automating the testing of various backup application versions according to one or more embodiments of the disclosure. Process 300 may use processing logic, which may include software, hardware, or a combination thereof. For example, process 300 may be performed by a system including one or more components described in operating environment 100.

The system (e.g. automation manager 175) may orchestrate (e.g. via a script, one or more commands, etc.) an automated testing procedure that includes initiating different versions of a backup application to perform various operations such as executing a backup policy to create a backup, and restoring data from the created backup. The system may then verify such operations are performed correctly including compatibility between backup application versions.

As shown in FIG. 3A, in 301, the system may select, amongst a set of upgrade combinations for versions of a backup application, a first upgrade combination for automated testing. For example, the first upgrade combination may include upgrading a first version of the backup application to a second version of the backup application. In some embodiments, when selecting an upgrade combination, the system may determine a set of versions of a backup application. For example, the system may determine a set of available (or to-be-tested) backup application versions. The system may then identify, amongst the set of versions of the backup application, one or more combinations of upgrading an initial version of the backup application to a subsequent version of the backup application. The system may then select, amongst the combinations, at least a first upgrade combination for automated testing. For example, the first upgrade combination may include a first version of the backup application as the initial version, and a second version of the backup application as the subsequent version. For example, referring to diagram 100, the system may determine that the application versions 177 available for a backup application 152 include backup application version 2.1, version 2.2, and version 3. Accordingly, the set of upgrade combinations may include version 2.1 to 2.2, version 2.1 to 3, and version 2.2 to 3. Amongst these combinations, the system may select version 2.1 as the first version, and version 2.2 as the second version. Accordingly, the system may perform an automated testing of upgrading the backup application from version 2.1 to 2.2.

In 302, the system may install the first version of a backup application within a testing environment (e.g. operating environment 100). For example, the system may install backup application version 2.1 within operating environment 100.

In 303, the system may create a first backup policy for a data protection asset. In some embodiments, the system may initiate the first version of the backup application to create the first backup policy. In some embodiments, the first backup policy may include a policy for backing up one or more data protection assets that store client data 190. For example, a data protection asset may include at least one of a VM, file system, operating system, database, database, or any other type of storage resource or data. For example, the data protection asset may be stored within a set of LUNs that are organized into one more consistency groups.

In 304, the system may initiate a first version of a backup application to execute the first backup policy to create a first backup of the data protection asset. In some embodiments, creating a backup of the data protection asset may include creating a primary backup and a recovery (or secondary) backup of the data protection asset. In some embodiments, the recovery backup may be stored within a storage (e.g. recovery storage environment 165B) that is remote from the primary backup. In addition, in some embodiments, different copying (or replication) techniques may be used to create the primary and recovery backups. For example, the system may create a snapshot of the data protection asset as a primary backup, and a clone (e.g. complete copy) of the data protection asset as a recovery backup. For example, referring again to diagram 100, the system may initiate backup application version 2.1 to execute the first backup policy to create a first backup of the data protection asset, which may include creating backup data A 180A as a primary backup, and recovery data A 185A as a recovery backup. In some embodiments, backup data A 180A may be created as a snapshot of the data protection asset, and recovery data A 185A may be created as a clone (or complete copy) of the data protection asset.

In 305, the system may verify a first restoration of the data protection asset. In some embodiments, the first restoration may be performed by the first version of the backup application and includes restoring the data protection asset from the first backup. In some embodiments, the restoration may including restoring the data protection asset from the primary backup and the recovery backup. Accordingly, the verifying may include verifying that data may be restored from different types of copies such as a snapshot or a clone. For example, the system may verify that backup application version 2.1 can restore the data protection asset from backup data A 180A (e.g. snapshot), and the data protection asset from recovery data A 185A (e.g. clone).

Once the system verifies operations performed by the first version of the backup application, the system may automate the testing of ensuring the second version of the backup application is compatible with aspects of the first version.

Accordingly, in 306, the system may install a second version of the backup application within the testing environment. For example, continuing with the previous example, the system may install (or active, use, invoke, etc.) backup application version 2.2. In some embodiments, installing the second version of the backup application includes upgrading the first version of the backup application (e.g. version 2.1) to the second version of the backup application (e.g. version 2.2).

In 307, the system may verify a second restoration of the data protection asset. In some embodiments, the second restoration may be performed by the second version of the backup application and includes restoring the data protection asset from the first backup created by the first version of the backup application. Accordingly, the system may verify that the second version of the backup application is capable of restoring a backup (e.g. first backup) that was created by a prior version (e.g. first version) of the backup application. For example, continuing with the previous example, the system may verify that backup application version 2.2 can restore the data protection asset from backup data A 180A (e.g. snapshot), and the data protection asset from recovery data A 185A (e.g. clone).

In addition, as part of the testing procedure of backup application version compatibility, the system may verify that the second version of the backup application may correctly execute the same backup policy (e.g. first backup policy) as a prior version (e.g. first version).

More specifically, in 308, the system may initiate the second version of the backup application to execute the first backup policy to create a second backup of the data protection asset. For example, continuing with the previous example and referring to diagram 100, the system may initiate backup version 2.2 to execute the first backup policy to create a second backup of the data protection asset including backup data B 180B (e.g. snapshot) as a primary backup, and recovery data B 185B (e.g. clone) as a recovery backup.

In some embodiments, the system may verify the second backup, in response to creating the second backup by the second version of the backup application. For example, the system may verify the second backup by comparing the second backup created by the second version of the backup application to the first backup created by the first version of a backup application. For instance, the system may confirm that attributes of the second backup match the attributes of the first backup. For example, the system may confirm that the attributes (e.g. counts, size, metadata, etc.) associated with snapshots and clones stored as part of backup data A 180A and recovery data A 185A respectively, match those of backup data B 180B and recovery data B 185B.

In 309, the system may verify a third restoration of the data protection asset. In some embodiments, the third restoration may be performed by the second version of the backup application and includes restoring the data protection asset from the second backup. For example, continuing with the previous example, the system may verify that backup application version 2.2 can restore the data protection asset from backup data B 180 B (e.g. snapshot), and recovery data B 185B (e.g. clone).

Accordingly the system may ensure compatibility between aspects of backup versions. In addition, the system may verify the second version (e.g. upgraded version) of the backup application can execute a new backup policy as further described with reference to FIG. 3B, which is a continuation of process 300 (e.g. as shown via connector element D).

As shown in FIG. 3B, in 310, the system create a second backup policy for the data protection asset. For example, the system may ensure the second version of the backup application may also create a backup policy. For example, the second backup version of the backup application may create the backup policy based on an input (or testing) configuration file. The second backup policy may be the same as, or different than, the first backup policy.

In 311, the system may initiate the second version of the backup application to execute the second backup policy to create a third backup of the data protection asset. For example, continuing with the previous example, the system may initiate backup application version 2.2 to execute the second backup policy (e.g. newly created backup policy) to create a third backup of the data protection asset including backup data C 180C (e.g. snapshot) as a primary backup, and recovery data C 185C (e.g. clone) as the recovery backup.

In 312, the system may verify a fourth restoration of the data protection asset. In some embodiments, the fourth restoration may be performed by the second version of the backup application and includes restoring the data protection asset from the third backup. For example, the system may verify that backup application version 2.2 can restore the data protection asset from backup data C 180C (e.g. snapshot), and recovery data C 185C (e.g. clone).

In addition, the system may verify additional versions of the backup application are compatible with multiple previous version by repeating certain operations above. In some embodiments, the system may repeat operations 306-312 for additional backup application versions or computing environments. For example, the system may install a third version of a backup application (e.g. upgrade the second version to the third version), and verify the third version of the backup application may correctly execute the backup policies of the prior backup applications (e.g. first and second backup policies). In addition, the system may verify the third version of the backup application may perform a restoration of the first, second, and third backups created by the prior backup application versions tested. Accordingly, the system may perform compatibility testing for any number of backup application upgrade combinations and computing environments in an efficient and automated manner.

Figure 4:
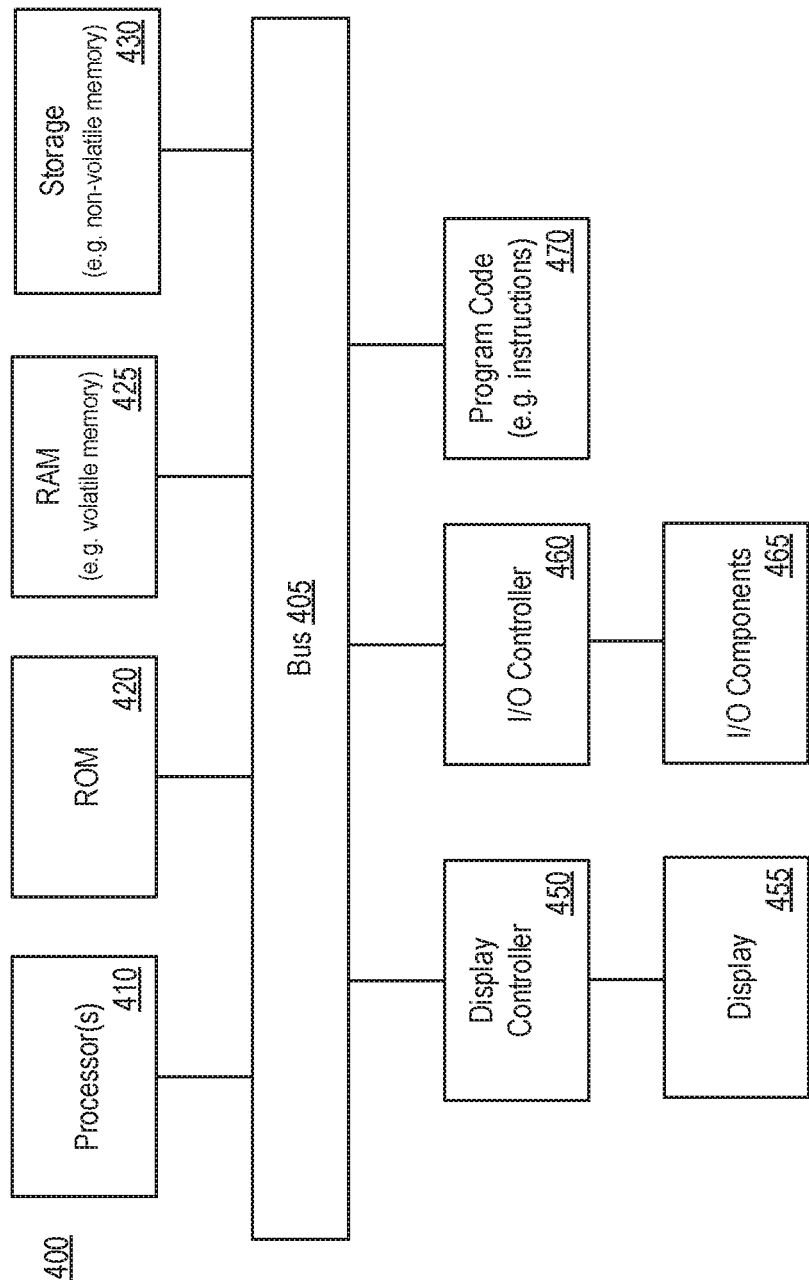
FIG. 4 is a block diagram illustrating an example computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. automation manager 175, storage environment 160) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. manager 175). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination.

For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A system comprising:
   one or more processors; and
   a non-transitory computer readable medium storing a plurality of instructions, which when executed, cause the one or more processors to:
   create a first backup policy for a data protection asset;
   initiate a first version of a backup application to execute the first backup policy to create a first backup of the data protection asset;
   verify a first restoration of the data protection asset, the first restoration performed by the first version of the backup application and includes restoring the data protection asset from the first backup;
   install a second version of the backup application within a testing environment;
   verify a second restoration of the data protection asset, the second restoration performed by the second version of the backup application and includes restoring the data protection asset from the first backup created by the first version of the backup application;
   initiate the second version of the backup application to execute the first backup policy to create a second backup of the data protection asset; and
   verify a third restoration of the data protection asset, the third restoration performed by the second version of the backup application and includes restoring the data protection asset from the second backup.

2. The system of claim 1, wherein the plurality of instructions, when executed, further cause the one or more processors to:
   create a second backup policy for the data protection asset;
   initiate the second version of the backup application to execute the second backup policy to create a third backup of the data protection asset; and
   verify a fourth restoration of the data protection asset, the fourth restoration performed by the second version of the backup application and includes restoring the data protection asset from the third backup.

3. The system of claim 1, wherein the plurality of instructions, when executed, further cause the one or more processors to:
   determine a set of versions of the backup application;
   identify, amongst the set of versions of the backup application, one or more combinations of upgrading an initial version of the backup application to a subsequent version of the backup application; and
   select, amongst the combinations, at least a first upgrade combination for automated testing, the first upgrade combination including the first version of the backup application as the initial version and the second version of the backup application as the subsequent version.

4. The system of claim 1, wherein creating the first backup of the data protection asset includes creating, by the first version of the backup application, a snapshot of the data protection asset as a primary backup and a full clone of the data protection asset as a recovery backup.

5. The system of claim 1, wherein the plurality of instructions, when executed, further cause the one or more processors to:
verify the second backup by comparing the second backup created by the second version of the backup application to the first backup created by the first version of the backup application.

6. The system of claim 1, wherein installing the second version of the backup application includes upgrading the first version of the backup application to the second version of the backup application.

7. The system of claim 1, wherein the data protection asset includes a set of logical unit numbers (LUNs) organized into one or more consistency groups.

8. A method of automated testing of a backup application, comprising:
creating a first backup policy for a data protection asset;
initiating a first version of the backup application to execute the first backup policy to create a first backup of the data protection asset;
verifying a first restoration of the data protection asset, the first restoration performed by the first version of the backup application and includes restoring the data protection asset from the first backup;
installing a second version of the backup application within a testing environment;
verifying a second restoration of the data protection asset, the second restoration performed by the second version of the backup application and includes restoring the data protection asset from the first backup created by the first version of the backup application;
initiating the second version of the backup application to execute the first backup policy to create a second backup of the data protection asset; and
verifying a third restoration of the data protection asset, the third restoration performed by the second version of the backup application and includes restoring the data protection asset from the second backup.

9. The method of claim 8, further comprising:
creating a second backup policy for the data protection asset;
initiating the second version of the backup application to execute the second backup policy to create a third backup of the data protection asset; and
verifying a fourth restoration of the data protection asset, the fourth restoration performed by the second version of the backup application and includes restoring the data protection asset from the third backup.

10. The method of claim 8, further comprising:
determining a set of versions of the backup application;
identifying, amongst the set of versions of the backup application, one or more combinations of upgrading an initial version of the backup application to a subsequent version of the backup application; and
selecting, amongst the combinations, at least a first upgrade combination for automated testing, the first upgrade combination including the first version of the backup application as the initial version and the second version of the backup application as the subsequent version.

11. The method of claim 8, wherein creating the first backup of the data protection asset includes creating, by the first version of the backup application, a snapshot of the data protection asset as a primary backup and a full clone of the data protection asset as a recovery backup.

12. The method of claim 8, further comprising:
verifying the second backup by comparing the second backup created by the second version of the backup application to the first backup created by the first version of the backup application.

13. The method of claim 8, wherein installing the second version of the backup application includes upgrading the first version of the backup application to the second version of the backup application.

14. The method of claim 8, wherein the data protection asset includes a set of logical unit numbers (LUNs) organized into one or more consistency groups.

15. A computer program product comprising a non-transitory computer-readable medium having a computer-readable program code embodied therein to be executed by one or more processors, the program code including instructions to:
create a first backup policy for a data protection asset;
initiate a first version of a backup application to execute the first backup policy to create a first backup of the data protection asset;
verify a first restoration of the data protection asset, the first restoration performed by the first version of the backup application and includes restoring the data protection asset from the first backup;
install a second version of the backup application within a testing environment;
verify a second restoration of the data protection asset, the second restoration performed by the second version of the backup application and includes restoring the data protection asset from the first backup created by the first version of the backup application;
initiate the second version of the backup application to execute the first backup policy to create a second backup of the data protection asset; and
verify a third restoration of the data protection asset, the third restoration performed by the second version of the backup application and includes restoring the data protection asset from the second backup.

16. The computer program product of claim 15, wherein the program code includes further instructions to:
create a second backup policy for the data protection asset;
initiate the second version of the backup application to execute the second backup policy to create a third backup of the data protection asset; and
verify a fourth restoration of the data protection asset, the fourth restoration performed by the second version of the backup application and includes restoring the data protection asset from the third backup.

17. The computer program product of claim 15, wherein the program code includes further instructions to:
determine a set of versions of the backup application;
identify, amongst the set of versions of the backup application, one or more combinations of upgrading an initial version of the backup application to a subsequent version of the backup application; and
select, amongst the combinations, at least a first upgrade combination for automated testing, the first upgrade combination including the first version of the backup application as the initial version and the second version of the backup application as the subsequent version.

18. The computer program product of claim 15, wherein creating the first backup of the data protection asset includes creating, by the first version of the backup application, a snapshot of the data protection asset as a primary backup and a full clone of the data protection asset as a recovery backup.

19. The computer program product of claim 15, wherein the program code includes further instructions to:
   verify the second backup by comparing the second backup created by the second version of the backup application to the first backup created by the first version of the backup application.

20. The computer program product of claim 15, wherein installing the second version of the backup application includes upgrading the first version of the backup application to the second version of the backup application.

* * * * *